Figure 1:
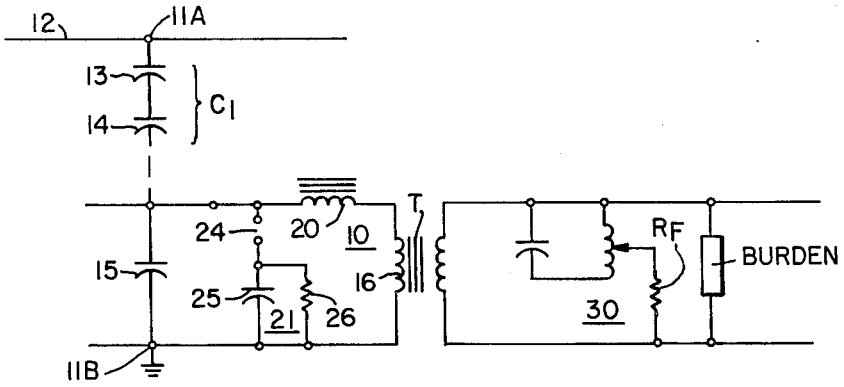
PRIOR ART FIG.1
Figure 2:
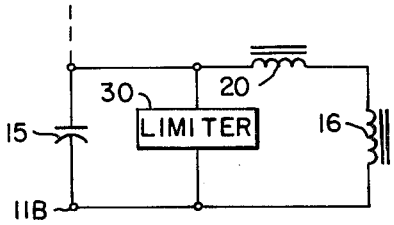
Figure 3:
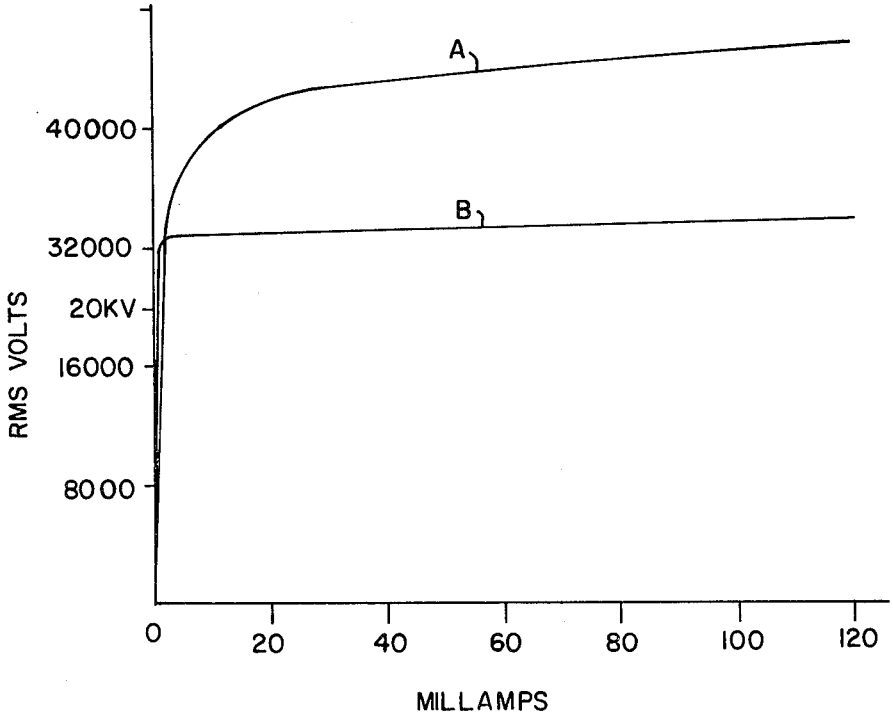

United States Defensive Publication [19] (H) [11] T967,008

Sweetana, Jr. et al. [43] Feb. 7, 1978

[54] CAPACITIVE VOLTAGE TRANSFORMER WITH IMPROVED FERRORESONANCE PROTECTION DEVICE

[75] Inventors: Andrew S. Sweetana, Jr., Bloomington; Frederick J. Brown, Ellettsville; Gerald B. Boyette, Bloomington, all of Ind.

[73] Assignee: Westinghouse Electric Corporation, Pittsburgh, Pa.

[21] Appl. No.: 785,380

[22] Filed: Apr. 7, 1977

Related U.S. Application Data

[63] Continuation of Ser. No. 631,298, Jan. 12, 1975, abandoned.

[51] Int. Cl.[2] ..... G05F 3/06

[52] U.S. Cl. ..... 323/61; 361/38

[57] ABSTRACT

A coupling capacitor protection device with a voltage limiter connected across the tap capacitor feeding the induction transformer primary winding. The suppressor is a ceramic oxide nonlinear resistor changing from high to low resistance, thereby limiting the tap voltage to less than that at which the induction transformer core saturates in order to minimize ferroresonance in the circuit. Also, the limiter gives voltage protection to the tap capacitor circuit.

3 Claims, 1 Sheet Drawing,

7 Pages Specification

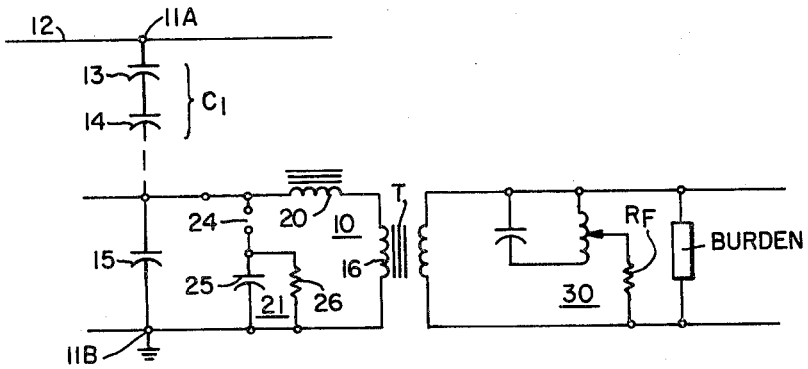

The file of this unexamined application may be inspected and copies thereof may be purchased (849 O.G. 1221, Apr. 9, 1968).